US006313895B1

(12) United States Patent
Tsuda et al.

(10) Patent No.: US 6,313,895 B1
(45) Date of Patent: Nov. 6, 2001

(54) REFLECTING PLATE, REFLECTION TYPE LIQUID CRYSTAL DISPLAY DEVICE AND PROCESSES FOR MANUFACTURING SAME

(75) Inventors: Kazuhiko Tsuda, Tenri; Mariko Ban, Nara; Naofumi Kimura, Nabari; Seiichi Mitsui, Kashiwa, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/955,632

(22) Filed: Oct. 23, 1997

(30) Foreign Application Priority Data

Oct. 23, 1996 (JP) .................................................. 8-281153

(51) Int. Cl.⁷ ....................... G02F 1/1333; G02F 1/1335; G02F 1/1343
(52) U.S. Cl. ........................... 349/113; 349/116; 349/110; 349/139
(58) Field of Search ................................... 349/113, 116, 349/110, 139

(56) References Cited

U.S. PATENT DOCUMENTS

| 5,204,765 | 4/1993 | Mitsui et al. | 359/70 |
| 5,408,345 | 4/1995 | Mitsui et al. | 359/59 |
| 5,418,635 | 5/1995 | Mitsui et al. | 359/70 |
| 5,610,741 | * 3/1997 | Kimura | 349/113 |
| 5,691,791 | * 11/1997 | Nakamura et al. | 349/113 |
| 5,805,252 | * 9/1998 | Shimada et al. | 349/113 |
| 5,847,789 | * 12/1998 | Nakamura et al. | 349/99 |
| 5,936,688 | * 8/1999 | Tsuda et al. | 349/113 |
| 5,949,507 | * 9/1999 | Shimada et al. | 349/113 |

FOREIGN PATENT DOCUMENTS

| 58002821 | 1/1983 | (JP) . |
| 4-243226 | 8/1992 | (JP) . |
| 5-232465 | 9/1993 | (JP) . |
| 5-323371 | 12/1993 | (JP) . |
| 6-27481 | 2/1994 | (JP) . |
| 6-75238 | 3/1994 | (JP) . |
| 6-175126 | 6/1994 | (JP) . |
| 7146472 | 6/1995 | (JP) . |

\* cited by examiner

*Primary Examiner*—William L. Sikes
*Assistant Examiner*—Julie Ngo
(74) *Attorney, Agent, or Firm*—Dike, Bronstein, Roberts & Cushman IP Group; David G. Conlin; David A. Tucker

(57) ABSTRACT

An object of the present invention is to provide a reflecting plate having excellent reflecting characteristics and a reflection type liquid crystal display apparatus having an improved display quality. A mask has a plurality of basic uneven spot patterns for individual pixels, and two or more uneven regions for at least one basic uneven spot pattern are formed. Any two of the two or more uneven regions appear at least in a relation of parallel displacement in which the uneven spot patterns are displaced in parallel with each other, among relations of parallel displacement, rotational displacement and reversal of uneven spot pattern, and the uneven regions are irregularly arranged. A reflecting plate and a reflection type liquid crystal display apparatus both having convexes are manufactured by an exposure of a photosensitive resin film using the mask. Even in the case where an exposure step is repeated in different positions, no seam is observed. Accordingly, even in the case of a high parallelism of an incident light, an interference color can be prevented to improve the reflecting characteristics and the display characteristics.

6 Claims, 13 Drawing Sheets

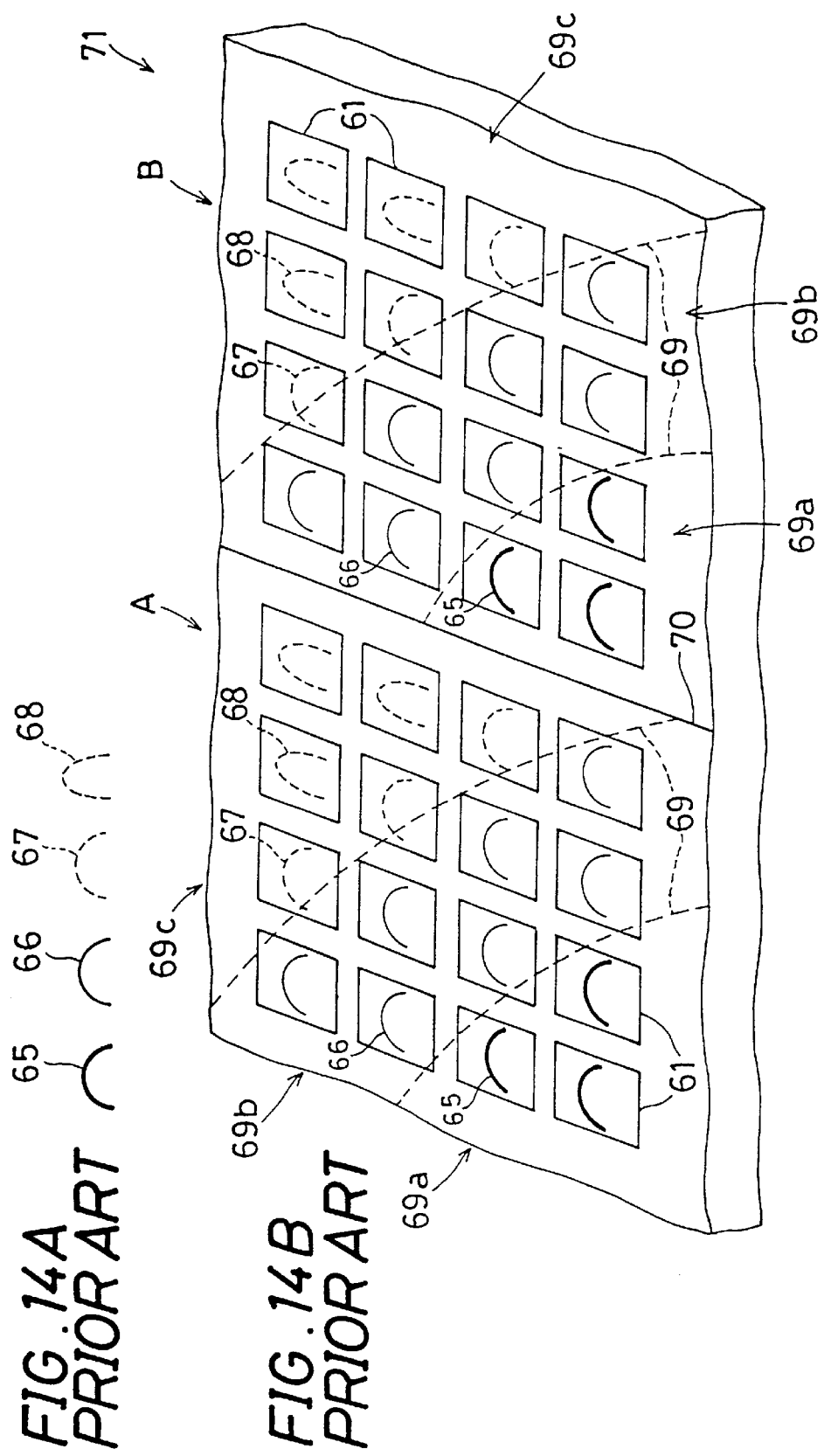

REFLECTING PLATE, REFLECTION TYPE LIQUID CRYSTAL DISPLAY DEVICE AND PROCESSES FOR MANUFACTURING SAME

TITLE OF THE INVENTION

Reflecting Plate, Reflection type Liquid Crystal Display Device and Processes for Manufacturing Same

BACKGROUND OF THE INVENTION

1. Field of the Invention

The present invention relates to a reflecting plate to be used in a matrix display apparatus for reflecting an incident light, and a method for manufacturing the reflecting plate. More particularly, the invention relates to a reflection type liquid crystal display apparatus for effecting a display by reflecting an incident light on pixel electrode surfaces but without using any backlight, and a method for manufacturing the liquid crystal display apparatus.

2. Description of the Related Art

Of liquid crystal display apparatuss, the reflection type for effecting a display by reflecting an incident light coming from the outside has been noted for its low power consumption because of no necessity for a backlight as a light source and for its thin and light construction. In order to acquire a brighter display in the reflection type liquid crystal display apparatus, it is necessary to prepare a reflecting plate which has optimum reflecting characteristics for increasing the intensity of light to be scattered to the observer. For this necessity, the formation of a reflecting plate which has an uneven surface capable of realizing the "paper white" has been accepted as an important technique.

Japanese Unexamined Patent Publication JP-A 5-323371 (1993) has disclosed a technique for forming uneven spots on a surface of the reflecting plate with a photosensitive resin by the photo process. FIGS. 9A and 9B are top plan views showing a mask 1b of the prior art to be used for forming the uneven spots on the surface of the reflecting plate. FIG. 9A is a top plan view showing one pixel 61 of the mask 1b. FIG. 9B is a diagram showing an arrangement relation of unit patterns of the mask 1b.

The shape of the pixel 61 of the mask 1b is so designed that about two hundreds of circular regions 62, for example, are arranged at random so as to form the uneven spots for suppressing the interference of the reflected lights. The pixel 61 is a square having sides 63 of 100 μm to 1,000 μm, for example, and has a unit pattern, as designated by a symbol 64. The mask 1b is designed to determine the entire arrangement of uneven spots by repeating the mirror reflections of the unit pattern 64.

The method of manufacturing the reflecting plate having the uneven spots will be described by using the masks 1b. FIG. 4 is a perspective view for explaining an exposure step in the general reflecting plate manufacturing method. A photosensitive resin film 17 is formed over a predetermined substrate 10. A spherical exposure lamp 18 of a stepper device is arranged above the photosensitive resin film 17 of the substrate 10 to expose the photosensitive film 17 through a mask 1. The area to be irradiated by one exposure is dependent upon the size of the exposure lamp 18 and is no more at present than a size of a diagonal length of about 12.7 cm at the most. When a reflecting plate having a diagonal length of about 12.7 cm or more is to be manufacture, a predetermined number of exposure steps are repeated by moving the location of the mask 1 or the substrate 10. By one exposure, for example, only an exposure face A is exposed in the substrate 10. After this, different exposure faces B to H are sequentially exposed by moving the mask 1 or the substrate 10. By causing the circular regions 62, as owned by the conventional mask 1b used as the mask, to act as light shielding portions, for example, the regions of the photosensitive resin film 17 other than the circular regions 62 are exposed to the light.

When the exposed photosensitive resin film 17 is developed with a developer, circular columns are formed on regions corresponding to the circular regions 62. These circular columns are rounded to convexes having rounded surfaces by a heat treatment at 120 to 250° C. All over the surface of the substrate 10 is formed a light reflecting film made of a metallic thin film, so as to cover the convexes. This light reflecting film is formed by the convexes into a continuously curved surface having gently conical uneven spots. The reflecting plate thus formed to have the uneven surface increases the intensity of light directed toward the observer so that it provides a bright paper white display when used in the reflection type liquid crystal display apparatus.

The mask 1b of the prior art is designed by repeating the mirror reflections of the unit pattern of the pixel 61 having the circular regions 62, as described above. The reflecting plate is made convex by the mask 1b so that the reflection type liquid crystal display apparatus utilizing the reflection plate can provide the bright paper white display. In case the reflection plate is large-sized, however, the exposure step is repeated plural times, and accordingly the reflecting characteristics are lowered with the result that the display quality is lowered in the display apparatus. That will be detailed in the following.

"FIG. 10 is a diagram illustrating an exposure intensity distribution by the exposure lamp 18 of the stepper device. By joining the points each having an equal exposure intensity in a region 23 to be exposed with curves, the portions of the high and low exposure intensities are expressed with contour lines 24 expressing gentle uneven spots. The exposure intensities become higher as arrows 25 come closer to a region 26 and the weaker as the arrows 25 come the closer to a region 27. This difference in the exposure intensity causes a dispersion of about 3% in the exposed region 23 and accordingly a nonuniformity in the exposure."

FIG. 11 is a diagram illustrating an optical intensity distribution of the case in which the exposure step is repeated plural times in different positions. For example, the exposures are executed in the order of exposure faces A, B, C and D. The exposure intensity gently changes for the exposure of only the face A but abruptly changes at each seam 28 between the faces for the exposures of two or more times in different positions. This abrupt change in the exposure intensity is observed as the exposure nonuniformity.

FIGS. 12A and 12B are perspective views illustrating a difference in shape between convexes 21 due to the exposure intensity. FIG. 12A shows the case in which the exposure intensity is high, and FIG. 12B shows the case in which the exposure intensity is low. Each circular column 20 to be formed on the surface of the substrate 10 is the thinner for the higher exposure intensity. By the heat treatment of the circular columns 20, the convexes 21 are rounded to have smooth surfaces. If the convexes 21 have a height d, they are the steeper for the higher exposure intensity and the gentler for the lower exposure intensity. The convexes 21 are given the different shapes as a result of the exposure nonuniformity.

FIGS. 13A and 13B are graphs illustrating the difference in the reflecting characteristics between the convexes 21 due to the exposure intensity. FIG. 13A illustrates the case in which the exposure intensity is high, and FIG. 13B illustrates the case in which the exposure intensity is low. The abscissa indicates an azimuth angle, and the ordinate indicates a reflection intensity. The reflection intensity is different at the portions of high and low exposure intensities because of the different shapes of the convexes 21. Specifically, the change in the reflection intensity is small over a wide range of visual angle at the portions of high exposure intensity and large over a range of visual angle at the portions of low exposure intensity.

FIGS. 14A and 14B are diagrams illustrating the change in the reflecting characteristics of a reflecting plate 71 in the case of using the conventional mask 1b in different positions. FIG. 14A illustrates a pattern of the reflecting characteristics, and FIG. 14B illustrates the reflecting characteristics of the exposure faces A and B. Reference numeral 65 indicates the state of the smallest change in the reflection intensity, which gradually becomes larger in the sequence of numerals 66, 67 and 68. The exposure faces A and B are formed of the plural pixels 61 which have the reflecting characteristics indicated by the numerals 65 to 68. Broken lines 69 are the contours indicating the exposure Intensity distribution by the exposure lamp 18. A region 69a is a region of much exposure, and this exposure becomes less in the sequence of regions 69b and 69c. By the first exposure, the face A is exposed, for example. By this single exposure, the uneven spots change continuously gently for the exposure nonuniformity, as indicated by the broken lines 69. According to this change, the reflecting characteristics change gently, too, so that the display nonuniformity, as might otherwise be caused the interference color, is not observed.

However, when the exposure step is repeated plural times on the faces A and B, for example, the nonuniformity of a seam 70 between the faces A and B is abruptly changed due to the abrupt change In exposure intensity. As a resulting the reflecting characteristics abruptly change in the seam 70 so that the difference in the reflection distribution is observed as an nonuniformity in the brightness. In the case of the display, the seam 70 is observed as a line so that the display quality is lowered.

FIG. 15 is a diagram illustrating the reflecting characteristics of the case in which the parallelism of an incident light is high in the conventional reflecting plate 71. By the repetitions of the identical unit patterns of the mask 1b, the individual pixels 61 of the reflecting plate 71 have the repetitions of the patterns which are identical in uneven spot shapes 72 and reflecting characteristics. For the parallel beam, therefore, the parallelism of the reflected lights also becomes high so that the interference color by the reflected lights is observed to seriously degrade the display quality.

SUMMARY OF THE INVENTION

An object of the invention is to solve the above-specified problems and to provide a reflecting plate having excellent reflecting characteristics, to provide a method for manufacturing the reflecting plate, and to provide a reflection type liquid crystal display apparatus having an improved display quality and a method for manufacturing the reflection type liquid crystal display apparatus.

The invention provides a reflecting plate to be used in an optical reflection type display apparatus having a plurality of pixels arrayed in a matrix form, the reflecting plate comprising uneven regions corresponding to the individual pixels, on a surface thereof, wherein the uneven regions are formed with the use of two or more basic uneven spot patterns.

According to the invention, the reflecting plate is used in the optical reflection type display apparatus having the plurality of pixels arrayed in the matrix form, and its surface is uneven on its surface portions corresponding to the individual pixels, so that the intensity of the light to be scattered toward an observer can be increased with respect to an incident light. Because the uneven regions are formed with the use of the two or more basic uneven spot patterns, moreover, an abrupt change in the reflecting characteristics can be prevented to form no seam. In the case of a parallel beam, still moreover, the reflecting characteristics of the individual pixels can be made different to prevent the interference of the reflected lights so that excellent reflecting characteristics can be achieved. Thus, in the case where the reflecting plate is used in the optical reflection type display apparatus degradation of display quality caused by Interference and a seam can be prevented.

The invention is characterized in that at least one of the two or more basic uneven spot patterns is composed of plural uneven spot patterns including rotation and reversal patterns thereof, and the uneven regions are formed by any patterns selected at random from among the two or more basic patterns.

According to the invention, the reflecting plate has the above-specified relation or relations, and its adjoining pixels have the uneven spot patterns of different reflecting characteristics so that no display nonuniformity occurs. Even in the case of a parallel beam, moreover, no change in the periodic reflecting characteristics can be caused to prevent the interference of the reflected lights without fail.

Moreover, the invention provides a reflection type liquid crystal display apparatus comprising: a pair of insulating substrates arranged through a liquid crystal layer; and a plurality of light reflective pixel electrodes arranged in a matrix array at the liquid crystal layer side of either of the insulating substrates, so that a light coming from the side of the other light transmitting insulating substrate is reflected on the pixel electrodes and emitted therefrom, wherein the pixel electrodes have uneven surf aces, and wherein two or more basic uneven spot patterns for the individual pixels are used.

According to the invention, in the reflection type liquid crystal display apparatus, there are arranged the plurality of light reflective pixel electrodes arrayed in the matrix form, and the individual pixel electrode have the uneven surfaces so that the display apparatus can increase the intensity of the light to be scattered toward the observer, with respect to the incident light thereby to provide a bright paper white display. The two or more basic uneven spot patterns are provided for the individual pixels, so that any abrupt change in light reflectivity can be prevented with the result that no seam is formed. Even in the case of a parallel beam, on the other hand, the individual pixels have different reflectivity, so that the interference color can be prevented with the result that the display quality is improved.

The invention is characterized in that at least one of the two or more basic uneven spot patterns is composed of plural uneven spot patterns including rotation and reversal patterns thereof, and the respective pixel electrodes are formed by any patterns selected at random from among the two or more basic patterns.

According to the invention, the pixel electrodes have the above-specified relation or relations, and their adjoining pixel electrodes have the uneven spot patterns of different reflectivities, so that no display nonuniformity occurs. Even in the case of a parallel beam, moreover, no change in the periodic reflecting characteristics can be caused to prevent the interference of the reflected lights without fall.

Preferably, on the liquid crystal layer side surface of the one insulating substrate are formed a plurality of wiring lines which are insulated from one another and which intersect at a right angle; switching elements which are individually arranged in the square pixel regions formed by the Intersections of the wiring lines and which are connected with the wiring lines, and an insulating layer having an uneven surface covering at least parts of the wiring lines and the switching elements; the pixel electrodes are formed over the insulating layer and individually connected with the switching elements through the through holes formed in the insulating layer; light transmitting counter electrodes are formed to confront the pixel electrodes over the liquid crystal layer side surface of the other insulating substrate. In the reflection type liquid crystal display apparatus, the insulating layer having the uneven surfaces is formed to cover at least the parts of the plural wiring lines and switching elements, and the pixel electrodes are formed in every pixel regions over the insulating layer so that the pixel electrodes have the uneven surfaces. By these pixel electrodes, the intensity of the light to be scattered toward the observer can be increased over the incident light with respect to the incident light. The pixel electrodes are connected through the through holes with the switching elements so that the reflection type liquid crystal display apparatus can-provide a bright paper white display.

Further, the invention provides a manufacturing method for manufacturing a reflecting plate to be used in an optical reflection type display apparatus having a plurality of pixels arrayed in a matrix form. The reflecting plate manufacturing method comprises the step of forming a photosensitive resin film over a predetermined substrate and then exposing the photosensitive resin film through a mask having predetermined pattern regions, wherein the mask includes two or more basic uneven spot patterns for individual pixels, and the reflecting plate manufacturing method further comprises the step of developing the photosensitive resin film after the step of exposing the photosensitive resin film is repeated a predetermined number of times by moving the mask or the substrate.

According to the invention, a seamless reflecting plate can be manufactured by repeating an exposure step plural times with the use of the mask having tow or more basic uneven spot patterns.

Further the invention is characterized in that at least one of the two or more basic uneven spot patterns is composed of plural uneven spot patterns including a rotation pattern of the one basic uneven spot pattern and a reversal pattern of the one basic uneven spot pattern, and the uneven regions are formed by any patterns selected at random from among the two or more basic patterns.

According to the invention, the mask includes the plural uneven regions for at least one basic uneven spot pattern so that the its design can be simplified. Any two patterns have the above-specified relation or relations so that a number of uneven spot patterns of different reflecting characteristics can be formed easily and reliably thereby to provide a reflecting plate having excellent reflecting characteristics.

Moreover, the invention provides a method for manufacturing a reflection type liquid crystal display apparatus comprising a pair of insulating substrates arranged through a liquid crystal layer, and a plurality of light reflective pixel electrodes arranged in a matrix array at the liquid crystal layer side of either of the insulating substrates to reflect a light coming from the aide of the other light transmitting insulating substrate on the pixel electrodes to emit therefrom, the method comprising the steps of:

forming a photosensitive resin film on the one insulating substrate so as to cover at least parts of switching elements formed over the one insulating substrate; and thereafter exposing the photosensitive resin film through a mask having predetermined pattern regions, wherein the mask includes two or more basic uneven spot patterns for individual pixels, the method further comprising the step of:

developing the photosensitive resin film after the step of exposing the photosensitive resin film is repeated a predetermined number of times by moving the mask or the one insulating substrate.

According to the invention, the reflection liquid crystal display apparatus, which is free from occurrence of seams and improved in the display quality, can be manufactured by repeating the exposure step with the use of the mask having the two or more basic uneven spot patterns.

Moreover the intention is characterized in that at least one of the two or more basic uneven spot patterns is composed of plural uneven spot patterns including rotation and reversal patterns thereof, and the uneven regions are formed by any patterns selected at random from among the two or more basic patterns.

According to the invention, the mask includes the plural uneven regions for at least one basic uneven spot pattern, so that the its design can be simplified. Any two patterns have the above-specified relation or relations so that a number of uneven spot patterns of different reflecting characteristics can be formed easily and reliably thereby to provide a reflecting type liquid crystal display apparatus having excellent an improved display quality.

BRIEF DESCRIPTION OF THE DRAWINGS

Other and further objects, features, and advantages of the invention will be more explicit from the following detailed description taken with reference to the drawings wherein:

FIG. 2 is a diagram showing a relation of uneven spot patterns of the mask 1a;

FIGS. 5A and 5B are diagrams illustrating changes in the reflecting characteristics of the reflecting plate 13 when an exposure step is repeated plural times in different positions by using the mask 1a;

FIGS. 14A and 14B are diagrams illustrating changes in the reflecting characteristics of the reflecting plate 71 when an exposure step is repeated plural times in different positions by using the mask 1b of the prior art.

DETAILED DESCRIPTION OF THE PREFERRED EMBODIMENTS

Figure 1:
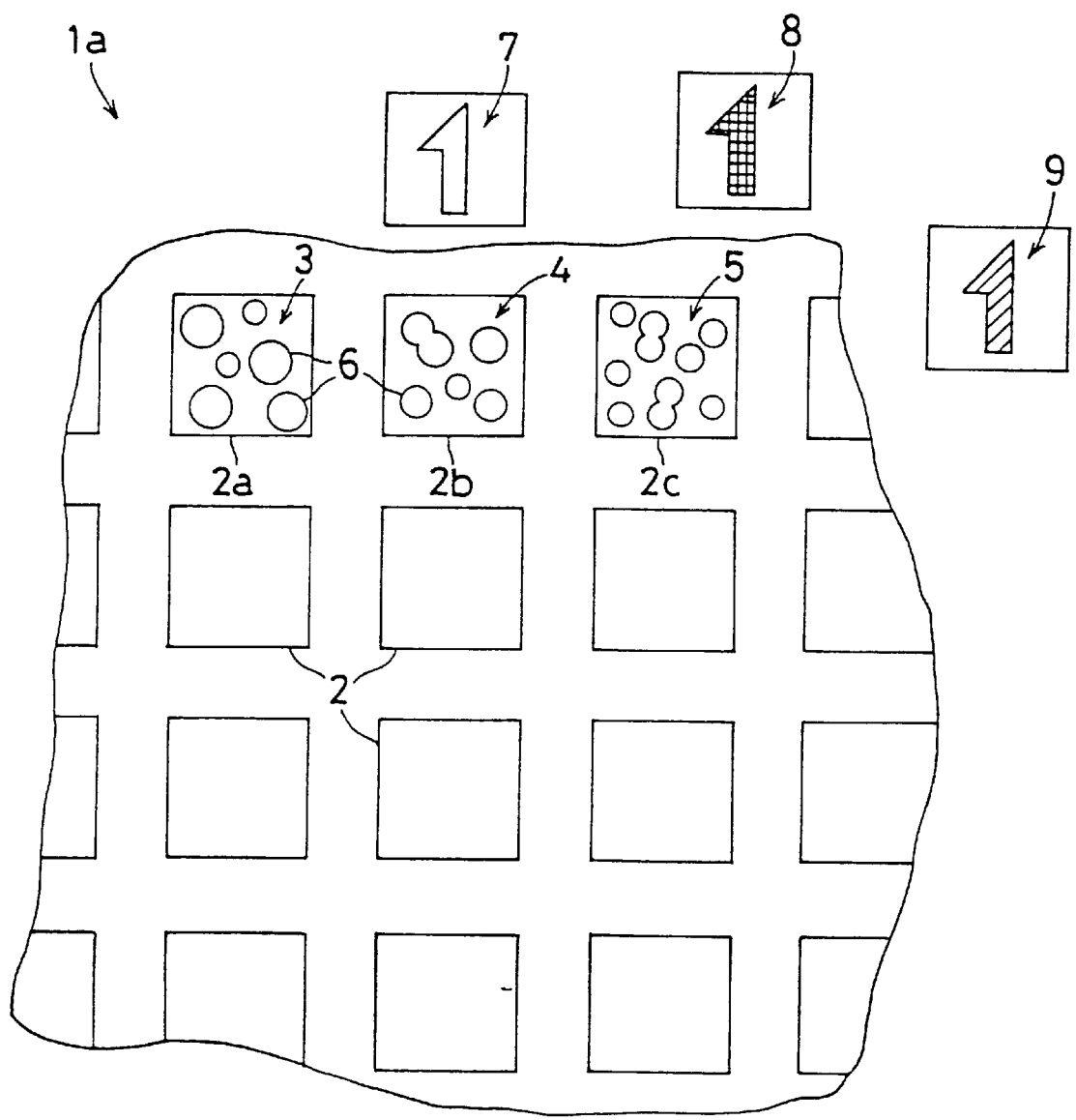
FIG. 1 is a top plan view showing a mask 1a to be used for manufacturing a reflecting plate and a reflection type liquid crystal display apparatus according to one embodiment of the invention.

Now referring to the drawings, preferred embodiments of the invention are described below.

Figure 2:
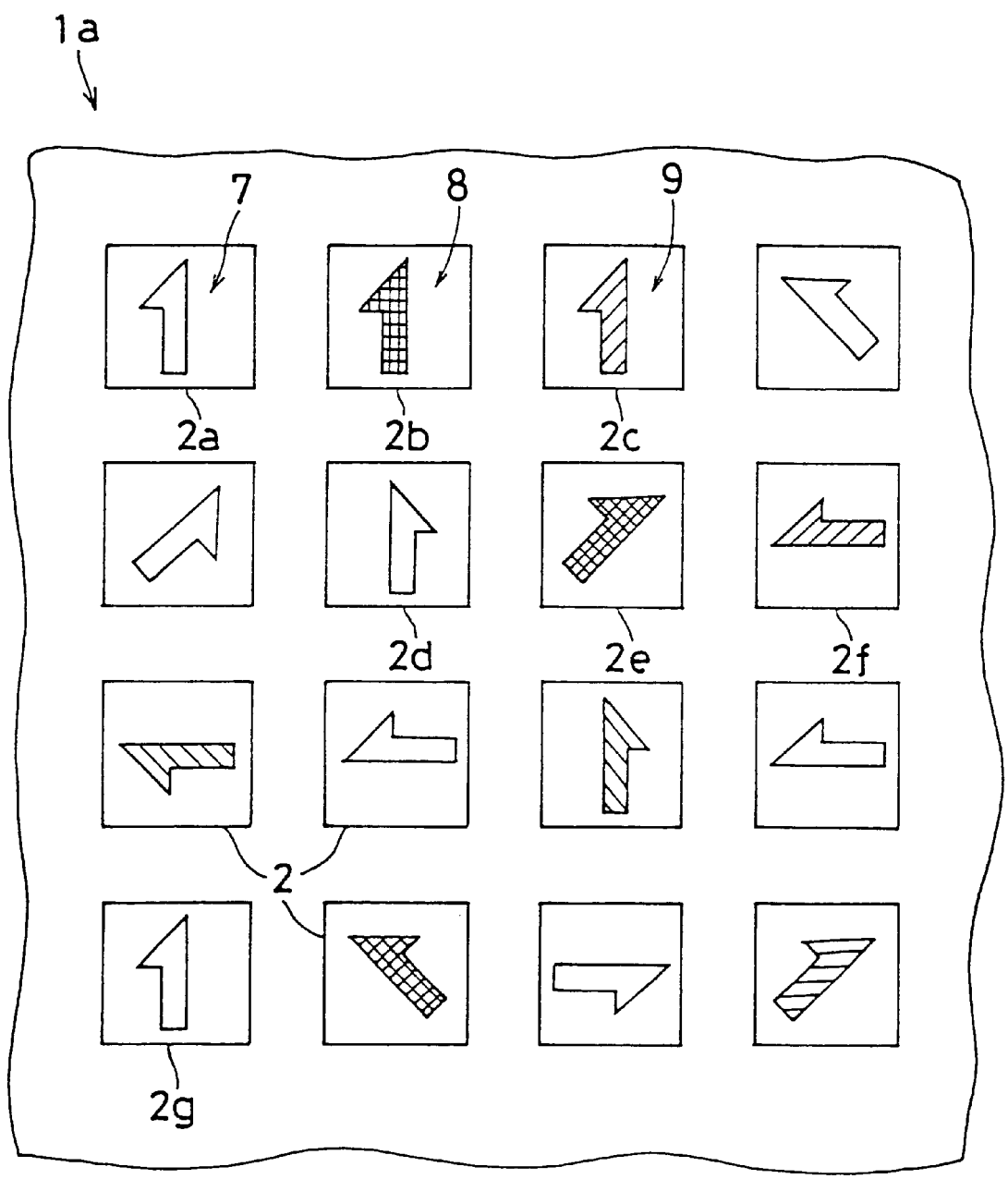

FIG. 1 is a top plan view showing a mask 1a to be used for manufacturing a reflecting plate and a reflection type liquid crystal display apparatus according to one embodiment of the invention, and FIG. 2 is a diagram showing a relation of uneven spot patterns of the mask 1a. The reflecting plate is employed in a display apparatus which has a plurality of pixels arranged in a matrix form. On the other hand, the reflection type liquid crystal display apparatus has a plurality of pixels arrayed in a matrix form. The mask 1a has two or more basic uneven spot patterns of the individual pixels 2. For example, the individual pixels 2a to 2c have different basic uneven spot patterns 3, 4 and 5.

Circular regions 6, as owned by the individual uneven spot patterns 3 to 5, are exemplified by light shielding portions which correspond to the convexes of circular columns formed over the reflecting plate and the substrate constructing the display apparatus. The remaining regions are light transmitting portions. The size and arrangement of the circular regions 6 are so designed by using the CAD (Computer Aided Design), for example, that the convexes of the individual pixels 2 over the substrate may be arranged at random. For example, the circular regions 6 are designed such that they have a gap of 2 μm at the least so as to prevent the adjoining convexes, when formed, from joining and such that the total area of the bottoms of the convexes formed in one pixel 2 occupies about 80% of the total area of the pixel 2. Here, the present embodiment will be exemplified by three basic uneven spot patterns 3 to 5, but the number of basic uneven spot patterns may be any if plural. However, three to five basic uneven spot patterns are preferable for the manufacture.

In order to facilitate the description of the uneven spot patterns of the mask 1a, the uneven spot patterns 3 to 5 are designated by numerals 7 to 9, respectively. The mask 1a includes two or more basic uneven spot patterns 3 to 5, respectively. Moreover, at least one of the two or more basic uneven spot patterns is composed of plural uneven spot patterns including rotation and reversal patterns thereof, and the uneven regions are formed by any patterns selected at random from among the two or more basic patterns.

For example, the uneven spot patterns of a pixel 2d are reversed and displaced in parallel from the uneven spot patterns 7 of the pixel 2a; the uneven spot patterns of a pixel 2e are rotate and displaced in parallel from the uneven spot patterns 8 of the pixel 2b; the uneven spot patterns of a pixel 2f are reversed, rotated and displaced in parallel from the uneven spot patterns 9 of the pixel 2c; and the uneven spot patterns of a pixel 2g are displaced in parallel from the uneven spot patterns 7 of the pixel 2a.

Thus, the arrangement of the convexes are assigned to all the pixels 2 to form the mask 1a by designing two or more basic uneven spot patterns 3 to 5 arranged at random by the CAD and by displacing in parallel, rotating and reversing the uneven spot patterns 3 to 5. By using two or more basic uneven spot patterns 3 to 5 a plurality of times at random, a number of uneven spot patterns of different reflecting characteristics can be easily formed to simplify the design of the mask 1a. The present embodiment has been described on the case in which three basic uneven spot patterns 3 to 5 are all in plurality. However, Any uneven spot pattern may be applied if two or more uneven regions for at least one basic uneven spot pattern are formed and the uneven regions are in the above-specified relations.

Figure 3A:
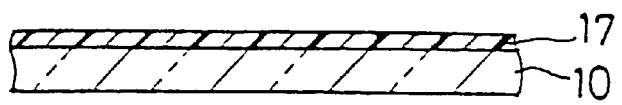
FIGS. 3A to 3E are sectional views showing the steps of a method for manufacturing a reflecting plate 13 according to the first embodiment of the invention.

FIGS. 3A to 3E are sectional views showing the steps of a method for manufacturing a reflecting plate 13 according to the first embodiment of the invention. The reflecting plate 13 is constructed to include a substrate 10, convexes 21 and a light reflecting film 22. The substrate 10 has a width of 320 mm and a length of 400 mm, for example, and is made of a glass substrate having a thickness of 1.1 mm, as known under the trade name "7059" of Corning Company. The substrate 10 is spin-coated over its one surface with a photosensitive resin film 17, e.g., a resist material known under the trade name of "OFPR-800" of Tokyo Ohka Company. The spin-coating is preferably executed at the number of revolutions of 500 to 3,000 rpm, and the photosensitive resin film is spin-coated at 1,000 rpm for 30 seconds, for example, to have a thickness of 1.2 μm. After this, a heat treatment is executed at 100° C. for 30 seconds. As a result, the photosensitive resin film 17 is formed over the substrate 10, as shown in FIG. 3A.

Figure 4:
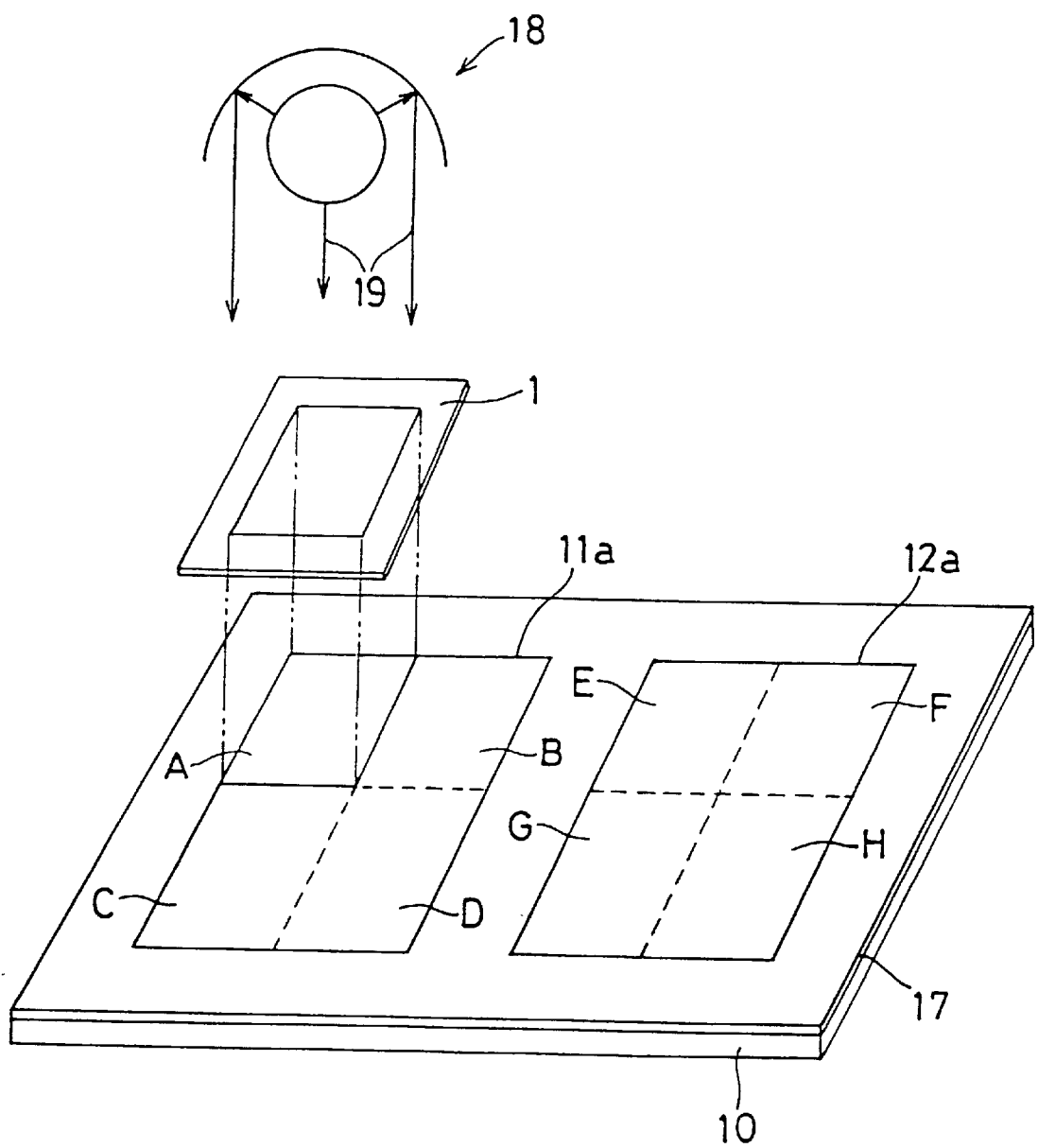
FIG. 4 is a perspective view for explaining an exposure step in the general reflecting plate manufacturing method.

Here will be described an exposure step. With reference to FIG. 4 presenting a perspective view for explaining the exposure step in the general reflecting plate manufacturing method, the substrate 10 is equipped on its one surface with arrangement regions 11a and 12a for juxtaposing two reflecting plates of 8.4 type having a diagonal length of 21.4 cm, for example. Since the area to be irradiated by a single exposure is restricted, the individual arrangement regions 11a and 12a are quartered into exposure faces A to D and exposure faces E to H, respectively, which are sequentially exposed, in the case of the exposure of the substrate 10 larger than the area of the single irradiation.

"The mask 1a acting as a mask 1 is arranged to confront the exposure face A, for example, over the substrate 10 having the photosensitive resin film 17 formed thereover. At the side of the mask 1 opposite to the substrate 10, there is arranged a circular exposure lamp 18 of the stepper device. This exposure lamp 18 irradiates and exposes the photosensitive resin film 17 with a light 19 through the mask 1. After the exposure of the face A, the exposure faces B to D and E to H are individually exposed in the sequential order by moving the mask 1 or the substrate 10. The mask 1 may be displaced only in parallel or in a reversed manner, for example."

Figure 3B:
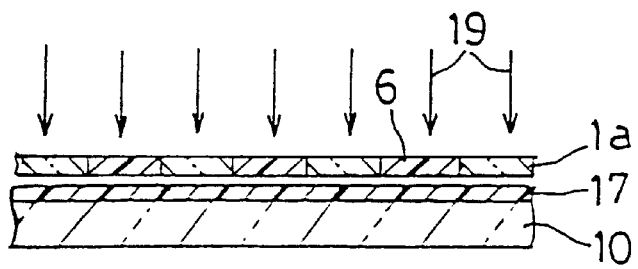
Figure 3C:
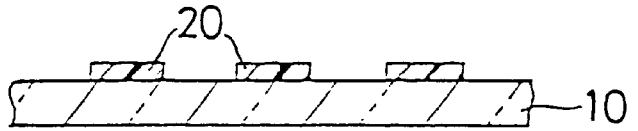

FIG. 3B is a sectional view showing in an enlarged scale the substrate 10 having the photosensitive resin film 17 of FIG. 4 and the mask 1. The circular regions 6 belonging to the mask 1a are light shielding portions so that the photosensitive resin film 17 is exposed to the light 19 coming from the exposure lamp 18 and transmitted through the regions other than the circular regions 6. When the development is executed by employing a solution of 2.38% of NMD-3, as known under the trade name of Tokyo Ohka Company, as the developing agent, micro columns 20 are formed on the surface of the substrate 10, as shown in FIG. 3C. The circles of the micro circular columns 20 are shaped to correspond to the circular regions 6 of the mask 1a.

Figure 3D:
Figure 3E:
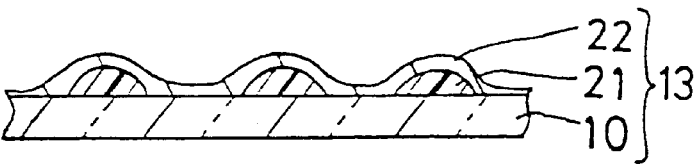

The micro columns 20 thus formed are subjected to a heat treatment at a temperature of 120 to 250° C. In the case of a heat treatment at a temperature of 180° C. for 30 minutes, for example, the micro columns 20 are rounded, as shown in FIG. 3D, to form the convexes 21 having smooth surfaces. All over the surface of the substrate 10, as shown in FIG. 3E, the light reflecting film 22 made of a metallic thin film is formed so as to cover the convexes 21. This light reflecting film 22 is formed to have a thickness of 0.01 to 1.0 $\mu$m by vacuum-depositing Al, for example. The light reflecting film 22 may be formed of a metal having a high reflectivity and capable of forming a thin film easily, such as Ni, Cr or Ag.

By the steps thus far described, the reflecting plate 13 is manufactured. The light reflecting film 22 of the reflecting plate 13 is formed into a conically gentle uneven shape which is given a continuous curved surface by the convexes 21. The reflecting plate 13 is enabled by the light reflecting film 22 to raise the intensity of the light to be scattered from the incident light toward the observer. Moreover, with the use of the mask 1a, the uneven regions of the reflecting plate 13, corresponding to adjoining pixels 2 are of different uneven spot patterns, so that the reflecting characteristics of the individual pixels 2 can be made different to provide excellent reflecting characteristics.

Figure 5:
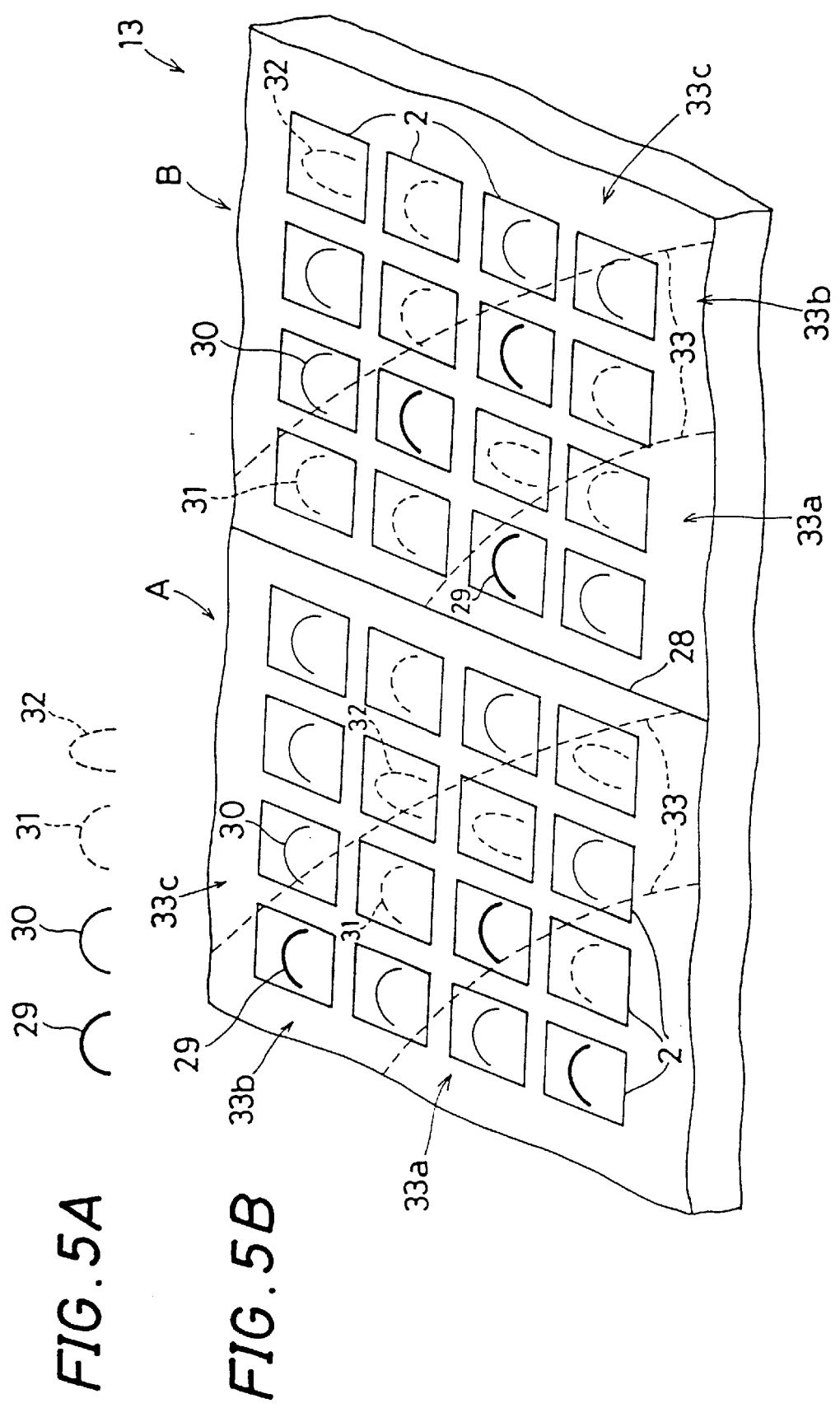

FIGS. 5A and 5B are diagrams illustrating changes in the reflecting characteristics of the reflecting plate 13 when a exposures step is repeated plural times in different positions with the use of the mask 1a. FIG. 5A shows a pattern of the reflecting characteristics, and FIG. 5B shows changes in the reflecting characteristics of the exposure face A and the exposure face B. Reference numeral 29 designates the state in which the reflection intensity takes the least change, and the change in the reflection intensity gradually rises in the order of numerals 30, 31 and 32.

The exposure faces A and B of the reflecting plate 13 are composed of the plurality of pixels 2 having the reflecting characteristics, as indicated by the numerals 29 to 32. Broken lines 33 are contours indicating the exposure intensity distribution by the exposure lamp 18. The region 33a is a portion where the exposure intensity is high, and this exposure intensity becomes lower as the regions advances in the order of 33b and 33c. Even in the case of an exposure nonuniformity, as indicated by the broken lines 33, the adjoining pixels 2 are arranged to have different uneven spot shapes, so that the differences of the reflecting characteristics, as indicated by the numerals 29 to 32, are not continuous. Thus, the reflecting characteristics do not correspond to the exposure nonuniformity so that they do not abruptly change at a seam 28 between the faces A and B. As a result, when the reflecting plate 13 is placed in a display apparatus, the line, as might appear in the display of the prior art, over the seam 28 is not apparent so that the display quality is improved.

Figure 6:
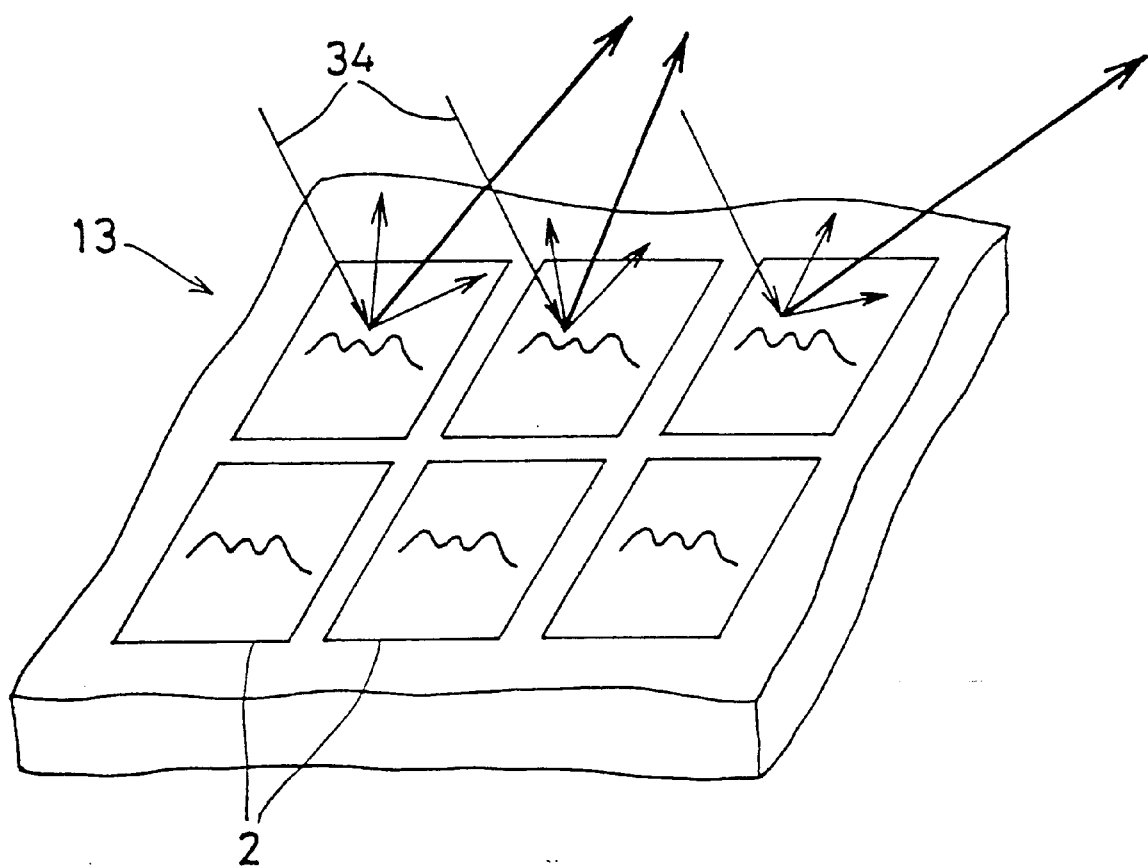
FIG. 6 is a diagram illustrating the reflecting characteristics of the reflecting plate 13 in the case of a high parallelism of an incident light.

FIG. 6 is a diagram illustrating the reflecting characteristics of the reflecting plate 13 in the case of a high parallelism of an incident light. Since the reflecting plate 13 is so arranged that the uneven spot shapes of the adjoining pixels 2 are different, a difference is established in the reflecting characteristics. Even in case, therefore, the parallelism of the incident light such as the solar ray is high, a light 34 does not make a periodical change in the reflecting characteristics. Since the light 34 is reflected in various directions by the reflecting characteristics, no interference color is observed to improve the display quality even in case the reflecting plate 13 is used in the display apparatus.

Here in the present embodiment, the material to be used for the photosensitive resin film 17 of the reflecting plate 13 has been described, as exemplified by the positive type. No matter whether the material might take a negative type or the positive type, however, any material may be adopted if it could be patterned when used at least in the step for the photolithography. The material can be exemplified by the product OMR-83, OMR-850, NNR-20, OFPR-2, OFPR-830 or OFPR-5000 of Tokyo Ohka Company, the product TF-20, 1300-27 or 1400-27 of Shipley Company, the product "photonees" of Toray Company, the product RW101 of Sekisui Fine Chemical Company, or the product R101 or R633 of Nippon Kayaku Company. Moreover, the light transmitting portions of the pattern shape of the mask 1a to be manufactured is formed in dependence upon which of the positive or negative type the photosensitive resin film 17 belongs to.

Moreover, the sizes of the substrate 10 and the liquid crystal panel arrangement regions 11a and 12a should not be limited to those exemplified in the present embodiment but could be sufficient for providing a liquid crystal panel of 5 type having a diagonal length of 12.7 cm or for forming only one liquid crystal panel over the substrate 10, for example. Similar effects could be achieved even from such modifications.

Figure 7:
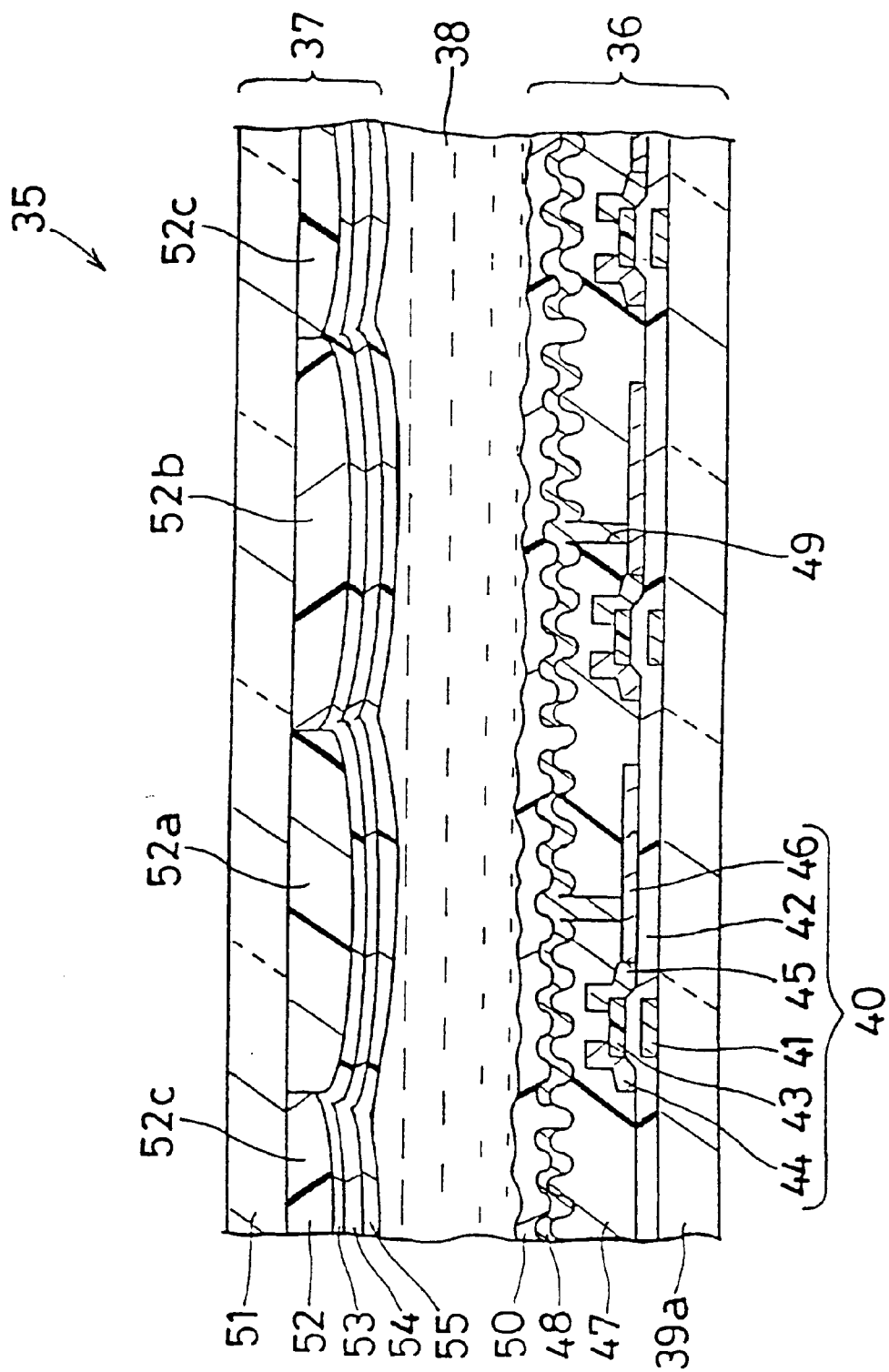
FIG. 7 is a sectional view showing a reflection type liquid crystal display apparatus 35 according to a second embodiment of the invention.
Figure 8:
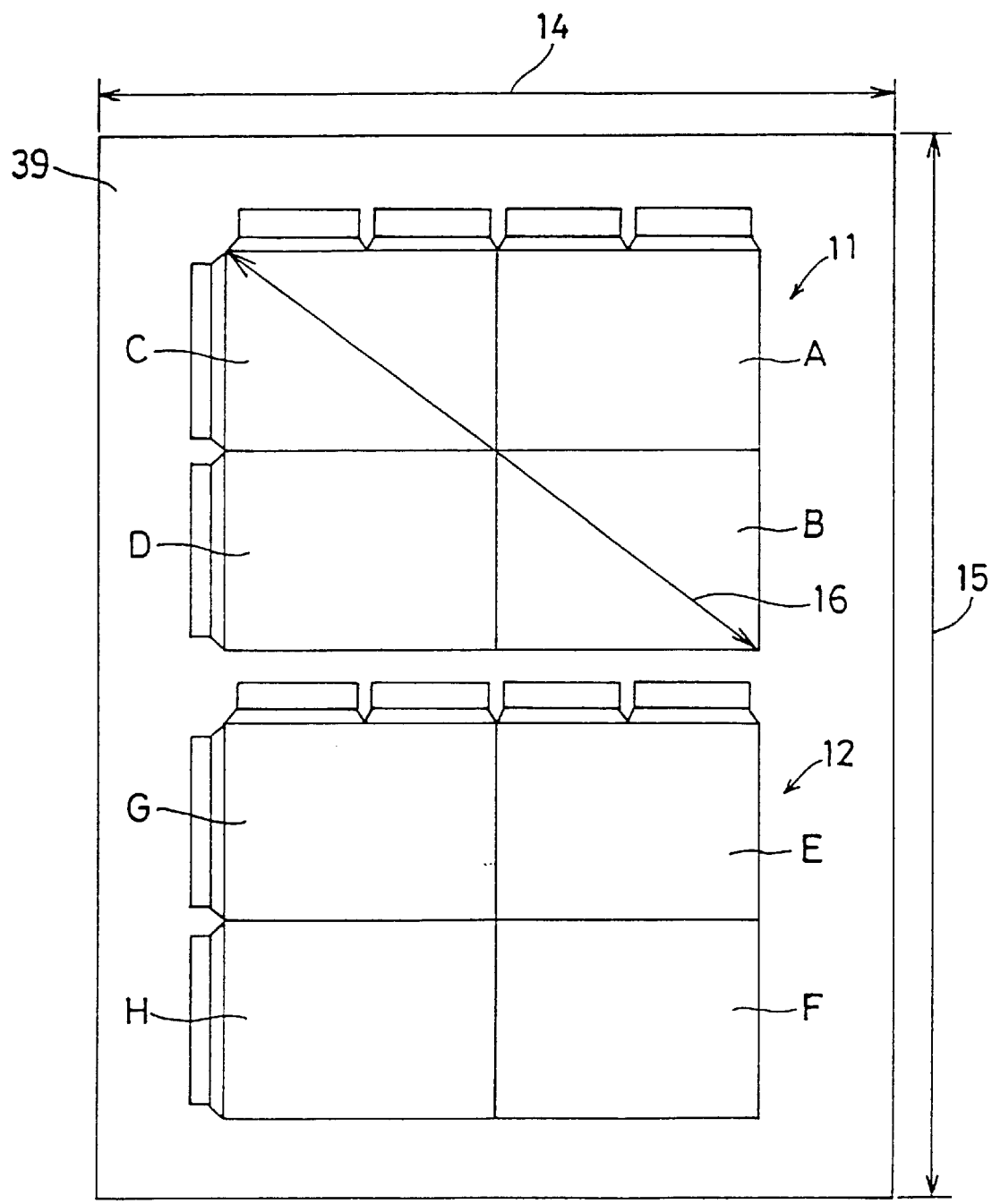
FIG. 8 is a top plan view showing a substrate 39 to form a substrate 39a and liquid crystal panels 11 and 12 constructing the reflection type liquid crystal display apparatus 35.
Figure 9A:
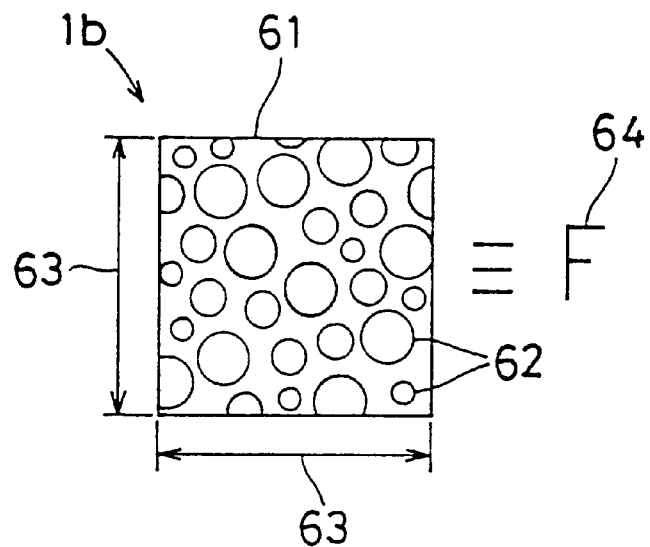
FIGS. 9A and 9B are top plan views showing the shape of the mask 1b of the prior art to be used for forming uneven spots on the surface of the reflecting plate.
Figure 9B:
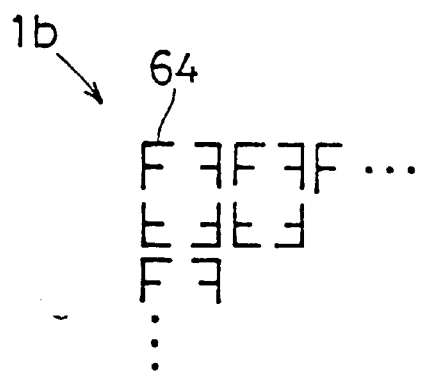
Figure 10:
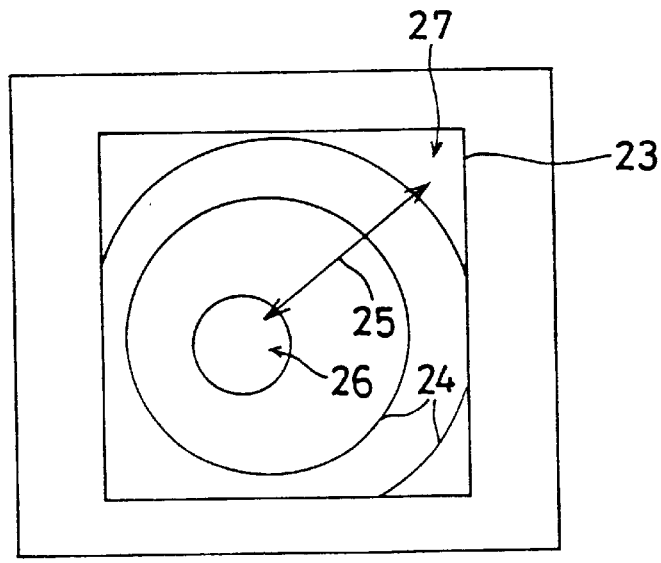
FIG. 10 is a diagram illustrating an exposure intensity by an exposure lamp 18 of a stepper device.
Figure 11:
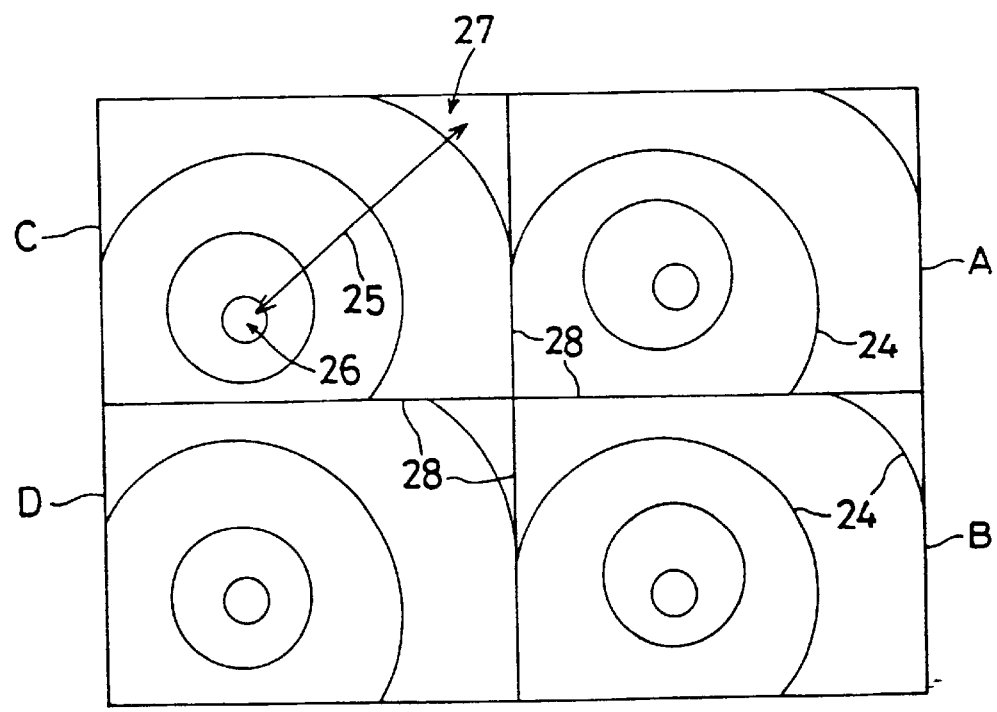
FIG. 11 is a diagram illustrating an optical intensity distribution when an exposure step is repeated plural times in different positions.
Figures 12A, 12B:
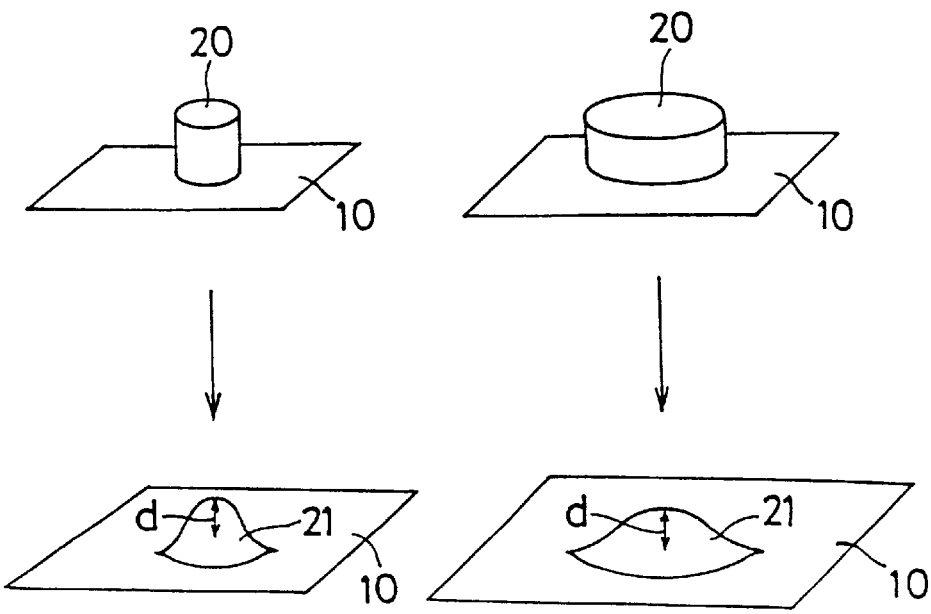
FIGS. 12A and 12B are perspective views illustrating a difference in shape between convexes 21 due to the exposure intensity.
Figures 13A, 13B:
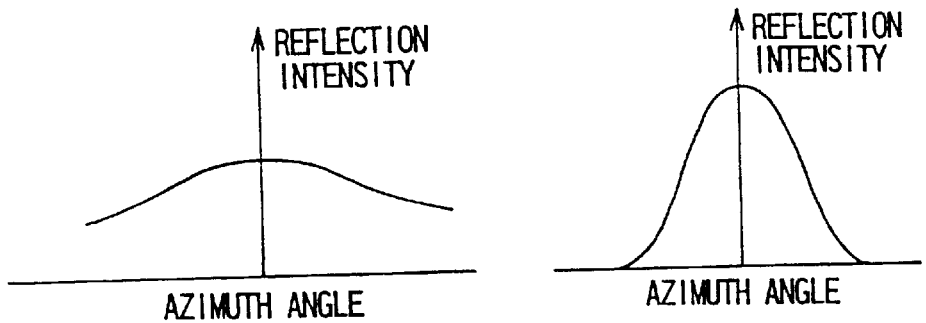
FIGS. 13A and 13B are graphs illustrating a difference in the reflecting characteristics between the convexes 21 due to the exposure intensity.
Figure 15:
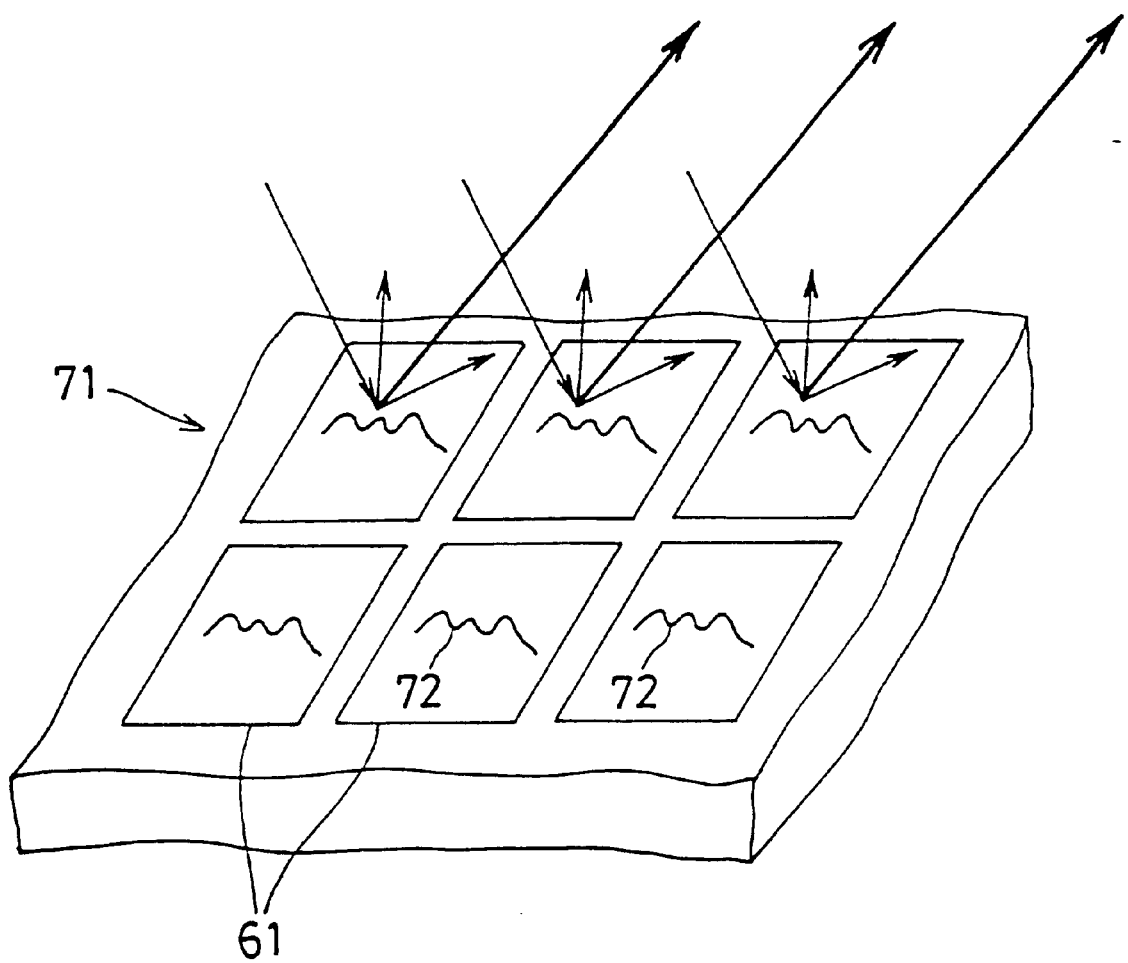
FIG. 15 is a diagram illustrating the reflecting characteristics of the reflecting plate 71 of the prior art when the parallelism of an incident light is high.

FIG. 7 is a sectional view showing the reflection type liquid crystal display apparatus 35 according to a second embodiment of the invention, and FIG. 8 is a top plan view showing a substrate 39 to form a substrate 39a and the two liquid crystal panels 11 and 12 constructing the reflection type liquid crystal display apparatus 35. The first embodiment has been described in connection with the reflecting plate 13 having the uneven surface, but the second embodiment will be described on the guest-host mode reflection type liquid crystal display apparatus 35 including reflecting pixel electrodes 48 having uneven surfaces.

"The reflection type liquid crystal display apparatus 35 is constructed to include one substrate member 36, the other substrate member 37 and a liquid crystal display layer 38. The substrate 39 for the substrate 39a owned by the substrate member 36 has a width 14 of 320 mm and a length 15 of 400 mm so that it can juxtapose two liquid crystal panels of 8.4 type having a diagonal display length 16 of 214 mm, and its one liquid crystal panel corresponds to the reflection type liquid crystal display apparatus 35. Since the area of the substrate 39, as can be irradiated by the single exposure, has a diagonal length of 12.7 cm or less, the regions corresponding to the liquid crystal panels 11 and 12 over the substrate 39 are individually quartered to form the exposure faces A to D and E to H, and these exposure faces A to D and E to H are sequentially exposed."

In the substrate member 36, a plurality of wiring lines insulated from one another and intersecting at a right angle are arranged over the substrate 39a made of the insulating glass, as having a thickness of 1.1 mm and known under the trade name of 7059 of Corning Company. Thin film transistor elements (as will be called the "TFT elements") 40 are individually formed as switching elements to be connected with the wiring lines in the square pixel regions which are formed by the intersections of the wiring lines. Each TFT element 40 is constructed to include a gate electrode 41, a gate insulating film 42, a semiconductor layer 43, a source electrode 44, a drain electrode 45 and a connection member 46.

An insulating layer 47 having an uneven surface formed by the exposure using the mask 1a, similar to that in the first embodiment is formed over the substrate 39a so as to cover at least parts of the wiring lines and the TFT elements 40. Over the insulating layer 47, the reflective pixel electrodes 48 which have uneven surfaces are arranged in a matrix form. The reflective pixel electrodes 48 are connected with the connection members 46 through individual through holes 49 formed in the insulating layer 47 and further with the drain electrodes 45 through the connection members 46. The insulating layer 47 is spin-coated over the reflective pixel electrodes 48 with an orientation film material which is made of a polyimide resin, as exemplified by the product SE-150 of Nissan Kagaku Company.

In the other substrate member 37, a color filter 52 is formed over a light transmitting insulating substrate 51. The color filter 52 is formed to include a red filter 52a, a green filter 52b and a blue filter 52c, which are arranged for each pixel. Over the color filter 52 is formed a flat film 53, over which are formed light transmitting counter electrodes 54 confronting the reflective pixel electrodes 48. Further an orientation film material is applied to overlay the flat film and the counter electrodes by the spin-coating method.

After having been spin-coated with the orientation film materials, the substrates 39a and 51 are sintered at a temperature of 180° C. and rubbed and are arranged such that the angle of twist of the liquid crystal molecules takes 240 degrees between the substrate members 36 and 37. The substrates 39a and 51 are opposed to each other such that the individual reflective pixel electrodes 48 and the individual filters 52a to 52c confront each other, and are adhered to each other by means of an adhesive containing a spacer of 4.5 μm. As the liquid crystal material for the liquid crystal layer 38, there is employed a guest-host type liquid crystal which is prepared by mixing a nematic liquid crystal of the product ZLI4792 of Merck Company, a two-tone black pigment, and 1.3% of chiral agent of the product S-811 of Merck Company. By employing the chiral agent, the ratio d0/P0 between a cell thickness d0 and a natural pitch P0 is 0.9.

Since the surfaces of the reflective pixel electrodes 48 are given the uneven spot shapes by the mask 1a, the differences in the reflecting characteristics of the individual reflective pixel electrodes 48 are not continuous even in when the exposure step is repeated plural times in the different positions. As in the first embodiment, no abrupt change in the reflecting characteristics is caused at the seams between the individual exposure faces A to D and E to H. As a result, the lines on the seams do not become apparent so that the excellent reflecting characteristics improve the display quality.

Even in the case of a parallel beam, on the other hand, the individual adjoining reflective pixel electrodes 48 are arranged to have the different uneven spots by the mask 1a. As a result, no periodic change occurs In the reflecting characteristics, but the light is reflected in various directions by the different reflecting characteristics so that no interference color is observed to improve the display quality.

Here, the substrates 39 and 39a may be an opaque substrate such as an Si substrate capable of exhibiting similar effects. When this opaque substrate is employed, the circuit can be easily integrated over the substrates 39 and 39a. On the other hand, the reflective pixel electrodes 48 to be formed over the insulating layer 47 may be formed over the TFT elements or the wiring lines. In this modification, the numerical aperture can be improved to effect a bright display.

Moreover, the reflection type liquid crystal display apparatus should not be limited to the guest-host mode. In addition, the display apparatus may be either of the active matrix type using switching elements other than the TFT elements or of the simple matrix type having no switching element.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reflecting plate for use in an optical reflection type display apparatus comprising:

a substrate;

a plurality of individual pixels, said pixels being arranged in a matrix array on said substrate; and an uneven reflective layer consisting of a reflecting film formed on a plurality of outwardly projecting raised spots, formed of a photosensitive resin material, disposed on said substrate in a predefined relationship to one another, said predefined relationship comprising two or more mutually independent basic pattern groupings of said outwardly projecting spots, and a selected one of said pattern groupings being formed for each of said individual pixels;

wherein each of said two or more mutually independent basic pattern groupings is disposed in any one of a translated, a reversed and/or a rotated orientation relative to the others having the same basic pattern grouping; and wherein the basic pattern groupings are arranged at random.

2. A reflection type liquid crystal display apparatus comprising:

a multilayered structure including first and second insulating substrates disposed on opposite sides of a liquid crystal layer; and a plurality of individual light reflective pixel electrodes in a matrix array disposed between said liquid crystal layer and one of said insulating substrates so as to reflect light incident thereon through said liquid crystal layer and the other of said insulating substrates;

wherein each of said individual light reflective pixel electrodes has an uneven reflective surface, wherein a selected one of two or more mutually independent basic uneven raised spot patterns is formed on each said reflective surface, wherein each of said two or more mutually independent basic uneven raised spot patterns is disposed in a translated, a reversed and/or a rotated orientation relative to the others having the same basic spot pattern; and further wherein the basic uneven raised spot patterns are arranged at random.

3. A manufacturing method for manufacturing a reflecting plate to be used in an optical reflection type display apparatus comprising:

provivding a substrate;

allocating said substrate into a plurality of individual pixels in a matrix array;

forming a photosensitive resin film on said matrix array;

providing a mask consisting of separate regions, each of said regions having multiple openings in a predetermined relationship to one another such that said regions include at least two or more mutually independent basic relationship patterns of said openings and said regions together form a matrix array such that each of said regions corresponding to each of said individual pixels; each of the two or more mutually independent basic relationship patterns is disposed in a translated, a reversed and/or a rotated orientation relative to the others having the same basic relationship pattern; and wherein the basic relationship patterns are arranged at random;

exposing the photosensitive resin film through said mask;

developing said photosensitive resin film; and forming a reflective film on the developed photosensitive resin film.

4. The manufacturing method for manufacturing a reflection plate of claim 3, wherein said exposing step includes sequentially aligning said mask on different regions of said photosensitive film by moving the mask or the substrate relative to one another.

5. A manufacturing method for manufacturing a reflection type liquid crystal display apparatus comprising:

providing a substrate;

allocating said substrate into a plurality of pixel portions in a matrix array;

forming a photosensitive resin film on said substrate so as to cover said pixel portions;

providing a mask having separate regions, each of said regions having multiple openings in a predetermined relationship to one another, said predetermined relationship including at least two or more mutually independent basic opening patterns, said regions together forming a matrix array corresponding to each of said pixel portions, and wherein each of the two or more mutually independent basic opening patterns is disposed in a translated, a reversed and/or a rotated orientation relative to the others having the same basic opening pattern, and wherein the basic opening patterns are arranged at random;

exposing the photosensitive resin film through said mask;

developing said photosensitive resin film; and forming a reflective film on the developed photosensitive film for providing a plurality of individual pixel electrodes in a matrix array disposed between a liquid crystal layer and said substrate for reflecting light incident thereon through said liquid crystal layer and another substrate;

whereby a multilayered structure including said substrates disposed on opposite sides of said liquid crystal layer is provided.

6. The manufacturing method for manufacturing a reflection type liquid crystal display apparatus of claim 5, wherein said exposing step includes sequentially aligning said mask on different portions of said photosensitive film by moving the mask or the substrate relative to one another.

* * * * *